United States Patent
Sakai

(10) Patent No.: US 7,385,732 B2
(45) Date of Patent: Jun. 10, 2008

(54) IMAGE READING APPARATUS, IMAGE FORMING APPARATUS AND IMAGE READING METHOD

(75) Inventor: Norikazu Sakai, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 948 days.

(21) Appl. No.: 10/786,538

(22) Filed: Feb. 26, 2004

(65) Prior Publication Data

US 2005/0063021 A1    Mar. 24, 2005

(30) Foreign Application Priority Data

Sep. 19, 2003    (JP)    ............................. 2003-328451

(51) Int. Cl.
*H04N 1/38* (2006.01)
*H04N 1/40* (2006.01)
*H04N 1/04* (2006.01)
*G06F 1/00* (2006.01)

(52) U.S. Cl. ...................... 358/463; 358/469; 358/474; 713/500

(58) Field of Classification Search ................ 358/463, 358/469, 474; 713/500, 501; 348/312, 241
See application file for complete search history.

(56) References Cited

U.S. PATENT DOCUMENTS

| | | | | |
|---|---|---|---|---|
| 5,323,239 A | * | 6/1994 | Ward et al. | 348/607 |
| 6,493,830 B2 | * | 12/2002 | Kamei | 713/501 |
| 6,958,830 B2 | * | 10/2005 | Kono | 358/443 |
| 6,963,373 B2 | * | 11/2005 | Imaizumi | 348/312 |
| 7,069,460 B2 | * | 6/2006 | Ohkawa | 713/500 |

FOREIGN PATENT DOCUMENTS

| | | |
|---|---|---|
| JP | 2001-77989 | 3/2001 |
| JP | 2001-268355 | 9/2001 |
| JP | 2001-281252 | 10/2001 |
| JP | 2003-8845 | 1/2003 |

\* cited by examiner

*Primary Examiner*—Houshang Safaipour
(74) *Attorney, Agent, or Firm*—Morgan, Lewis & Bockius LLP

(57) ABSTRACT

An image reading apparatus that reads out an original document image synchronously with a frequency dispersion clock gained by modulating the frequency of a reference clock so as to be changed cyclically at a predetermined modulation period, comprising:
 a first signal generating section that generates a first signal which turns into assert state at a predetermined period;
 a second signal generating section that generates a second signal which turns into assert state at a period synchronous with the modulation period of the frequency dispersion clock; and
 a line scanning section that moves a scanning position on the original document image in an auxiliary scanning direction and scans the original document image in a main scanning direction perpendicular to the auxiliary scanning direction each time when both the first signal and the second signal turn to assert state and thereby reads the original document image and outputs an analog image signal.

36 Claims, 13 Drawing Sheets

IMAGE READING APPARATUS, IMAGE FORMING APPARATUS AND IMAGE READING METHOD

BACKGROUND OF THE INVENITON

1. Field of the Invention

The present invention relates to an image reading apparatus for reading an image on an original document to acquire image data representing the image of the original document, an image forming apparatus for forming the image of the original document as a duplicate and an image reading method for reading the image on the original document.

2. Description of the Related Art

Intensification of resolution and accompanying improvement of productivity have been demanded in an image reading apparatus such as a scanner and a copier. Increasing of processing speed by loading with a high-frequency drive clock has been widely conducted.

An influence upon surrounding apparatuses of the high frequency radiated noise originating from a high-frequency clock has been discussed recently and there is a possibility that a fatal accident may occur. Thus, legal restrictions demanding suppression of radiated noise have been becoming strict. As a countermeasure for the radiated noise, there has been well known a frequency dispersion technology which reduces the peak level of the radiated noise by modulating the oscillation frequency of the drive clock continuously at a predetermined period.

FIG. 1 is a diagram for explaining the frequency dispersion technology.

FIG. 1(A) shows an example of a modulation pattern for dispersing the frequency of a reference clock. A modulation pattern A changes the frequency of clock in DOWN direction (direction that increases the period) and UP direction (direction that decreases the period) continuously. A reference clock A_1 having a predetermined frequency is modulated to a frequency dispersion clock A_2 in which the frequency is changed continuously at a modulation period T by this modulation pattern A and this frequency dispersion clock A_2 is used as a drive clock instead of the reference clock A_1. The modulation period signal A_3 is a signal outputted at a timing synchronous with the modulation period T of the frequency dispersion clock A_2.

FIG. 1(B) shows radiated noise levels when the reference clock A_1 and the frequency dispersion clock A_2 shown in FIG. 1(A) are used as each drive clock. A radiated noise level B_1 corresponding to the reference clock A_1 has a peak at a frequency Fp while in the radiated noise level B_2 of the frequency dispersion clock A_2, the frequency in the vicinity of the peak is dispersed and the peak level drops by that amount. In this way, the peak level of the radiated noise can be reduced by using the frequency dispersion clock A_2 as a drive clock.

Here, an ordinary example in which the above-described frequency dispersion technology is applied to a line reading type image reading apparatus which reads an image of an original document by scanning will be described.

The line scanning type image reading apparatus scans a scanning object line in a main scanning direction synchronously with the drive clock with an image pickup device, for example, a charge couple device (CCD) by moving the scanning object line in an auxiliary scanning direction in each predetermined line period. In the meantime, the image pickup device used generally is an analog device which stores electric charges by receiving light according to the phase of the drive clock or pulse width so as to output an analog signal. Therefore, if the frequency dispersion clock A_2 having a varied phase or pulse width is adopted as the drive clock, the signal strength of an outputted analog signal is deflected depending on a change in the frequency dispersion clock A_2, so that noise is added to image data generated based on the analog signal. Further, there occurs such a problem that beat noise which is oblique stripe is generated in an image represented by that image data because the deflected position differs depending on each line.

As a method for eliminating such a default, a method of correcting that beat noise to a vertical stripe which is easy to correct by synchronizing the scanning start timing of the line with the frequency dispersion clock of the drive clock has been proposed (for example, Japanese Patent Application Laid-Open No. 2001-77989, Japanese Patent Application Laid-Open No. 2001-281252, and Japanese Patent Application Laid-Open No. 2003-8845).

FIG. 2 is a diagram showing the relation between the modulation period and line scanning start timing based on the method described in the above-described patent documents.

As shown in FIG. 2, the output interval I100 of a line signal A_100 which indicates the scanning start for a line is integer times the modulation period T of the modulation period signal A_3 and rise-up timings $t_1$, $t_3$ of the line signal A_100 are synchronous with the rise-up timing of the modulation period signal A_3. In this case, an influence of the frequency dispersion clock is generated in each line and consequently, beat noise occurs at the same position of each line, so that the beat noise is corrected to a vertical stripe.

When an image is read by changing the magnification in an image reading apparatus, the image reading speed is changed corresponding to the magnification. For example, when an image is read at a reduction rate of 50%, the reading speed is twice that at the time of reading at an equal magnification (magnification is 100%) by reducing reading resolution or the like. Therefore, the line signal A_50 at the time of reading at 50% is outputted at an output interval half(I-50) that of the output interval I_100. At this time, the second rise-up timing $t_2$ of the line signal A_50 does not match with the rise-up timing of the modulation period signal A_3 and thus, the deflection position of the frequency dispersion clock differs depending on each line. Consequently, the beat noise is deviated from the vertical stripe. According to the above-described method, the beat noise can be corrected to the vertical stripe at the time of reading at the equal magnification. However, the beat noise may not be corrected to the vertical stripe, depending on the magnification at the time of reading in enlargement or reduction. Consequently, there is such a problem that the beat noise cannot be corrected easily.

SUMAMRY OF THE INVENITON

The present invention has been made in view of the above circumstances and provides an image reading apparatus capable of generating image data representing an image in which beat noise is corrected, an image forming apparatus capable of forming such a corrected image and an image reading method capable of reading the image in such a corrected state.

To achieve the above-described object, according to an aspect of the present invention, there is provided an image reading apparatus that reads out an original document image synchronously with a frequency dispersion clock gained by modulating the frequency of a reference clock so that it changes cyclically at a predetermined modulation period, having: a first signal generating section that generates a first signal which turns into assert state at a predetermined period; a second signal generating section that generates a second signal which turns into assert state at a period synchronous with the modulation period of the frequency dispersion clock; and a line scanning section that moves a scanning position on the original document image in an auxiliary scanning direction and scans the original document image in a main scanning direction perpendicular to the auxiliary scanning direction each time when both the first signal and the second signal turn to assert state so as to read the original document image and outputs an analog image signal.

In this specification, a reading unit extended in the main scanning direction on the original document image is called line.

The "assert state" means a state in which a signal and logic are valid.

In the image reading apparatus of the present invention, the original document image is scanned in the main scanning direction synchronously with the frequency dispersion clock at a timing when the first signal which turns into the assert state at a predetermined period and the second signal which turns into the assert state at a period synchronous with the modulation period of the frequency dispersion clock. The scanning timing for the line can be always matched with the same signal timing in the frequency dispersion clock by adjusting the period in which the first signal turns into the assert state depending on its image reading velocity, for example even if the image is reduced in size and read rapidly. Thus, all the lines are affected by the frequency dispersion clock in the same way. Therefore, beat noise generated in an image represented by image data generated by reading the original document image is corrected to vertical stripes and consequently, the beat noise can be corrected easily.

According to another aspect of the present invention, there is provided an image forming apparatus that reads out an original document image synchronously with a frequency dispersion clock gained by modulating the frequency of a reference clock so that it changes cyclically at a predetermined modulation period and forms plural images of the original document image, having:

a first signal generating section that generates a first signal which turns into assert state at a predetermined period; a second signal generating section that generates a second signal which turns into assert state at a period synchronous with the modulation period of the frequency dispersion clock; and a line scanning section that moves a scanning position on the original document image in an auxiliary scanning direction, scans the original document image in a main scanning direction perpendicular to the auxiliary scanning direction each time when both the first signal and the second signal turn to assert state so as to read the original document image and outputs an analog image signal.

According to still another aspect of the present invention, there is provided an image reading method that reads out an original document image synchronously with a frequency dispersion clock gained by modulating the frequency of a reference clock so that it changes cyclically at a predetermined modulation period, having the steps of:

generating a first condition in which assert state at a predetermined period is generated;

generating a second condition in which assert state is generated at a period synchronous with the modulation period of the frequency dispersion clock; and conducting line scanning in which a scanning position on the original document image is moved in an auxiliary scanning direction, and the original document image is scanned in a main scanning direction perpendicular to the auxiliary scanning direction synchronously with the modulation period of the frequency dispersion clock each time when the assert state is generated in the step of generating the first condition and the step of generating the second condition, and thereby allowing reading of the document image.

According to the present invention, an image reading apparatus capable of generating image data represented by an image whose beat noise is corrected even if the original document image is read out at any magnification, an image forming apparatus capable of forming such a corrected image and an image reading method capable of reading the image in such a corrected state are achieved.

BRIEF DESCRIPTION OF THE DRAWINGS

Preferred embodiments of the present invention will be described in detail based on the following figures, wherein.

DESCRIPTION OF THE PREFERRED EMBODIMENTS

Hereinafter, the preferred embodiments of the present invention will be described.

Figure 1A:
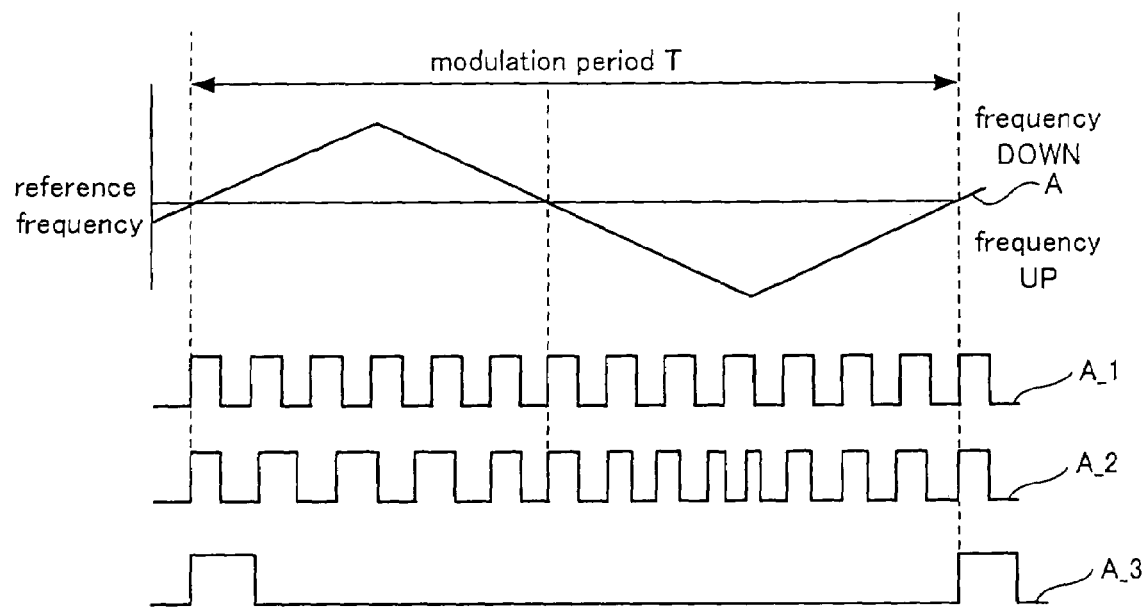
FIG. 1(A) is a diagram showing an example of modulation pattern for dispersing the frequency of a reference clock.
Figure 1B:
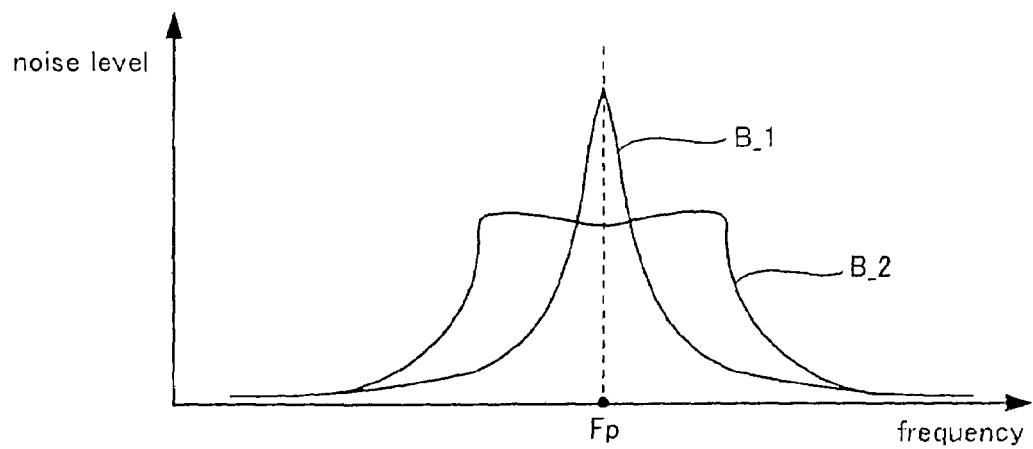
FIG. 1(B) is a diagram showing radiated noise level when the reference clock shown in FIG. 1(A) and the frequency dispersion clock are used as a drive clock.
Figure 2:
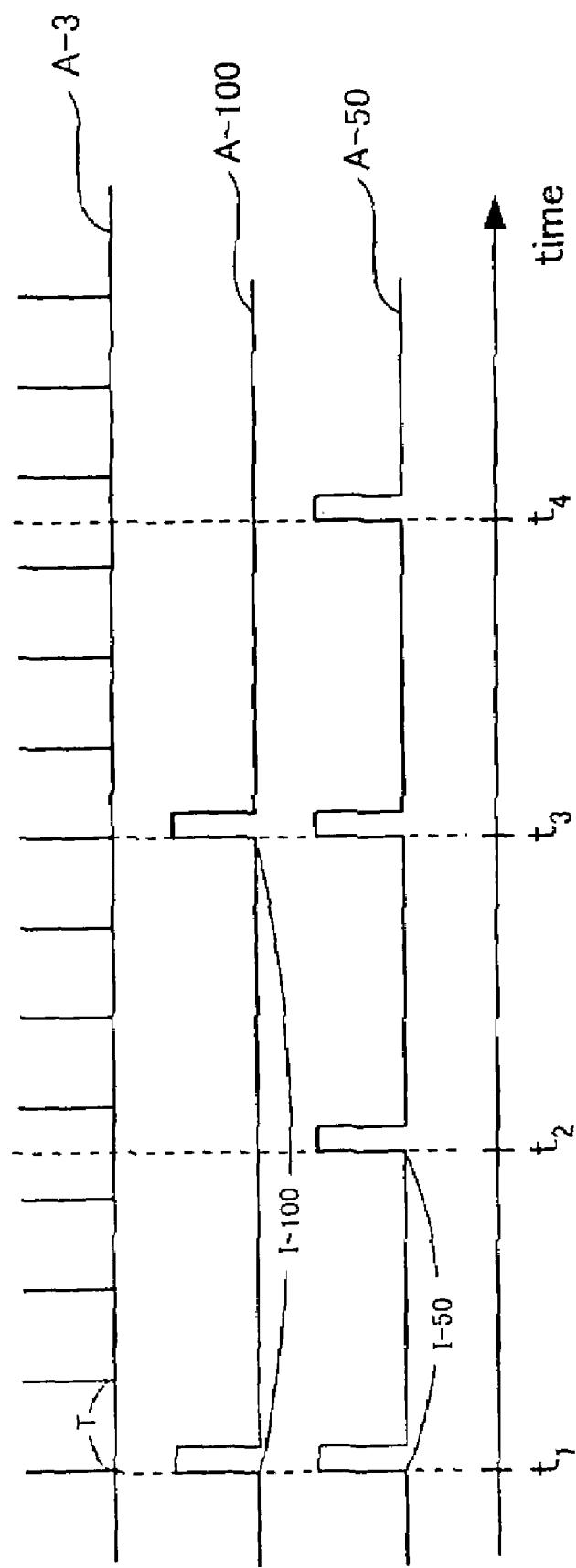
FIG. 2 is a diagram showing the relation between the modulation frequency and line period in the method described in the patent document.
Figure 3:
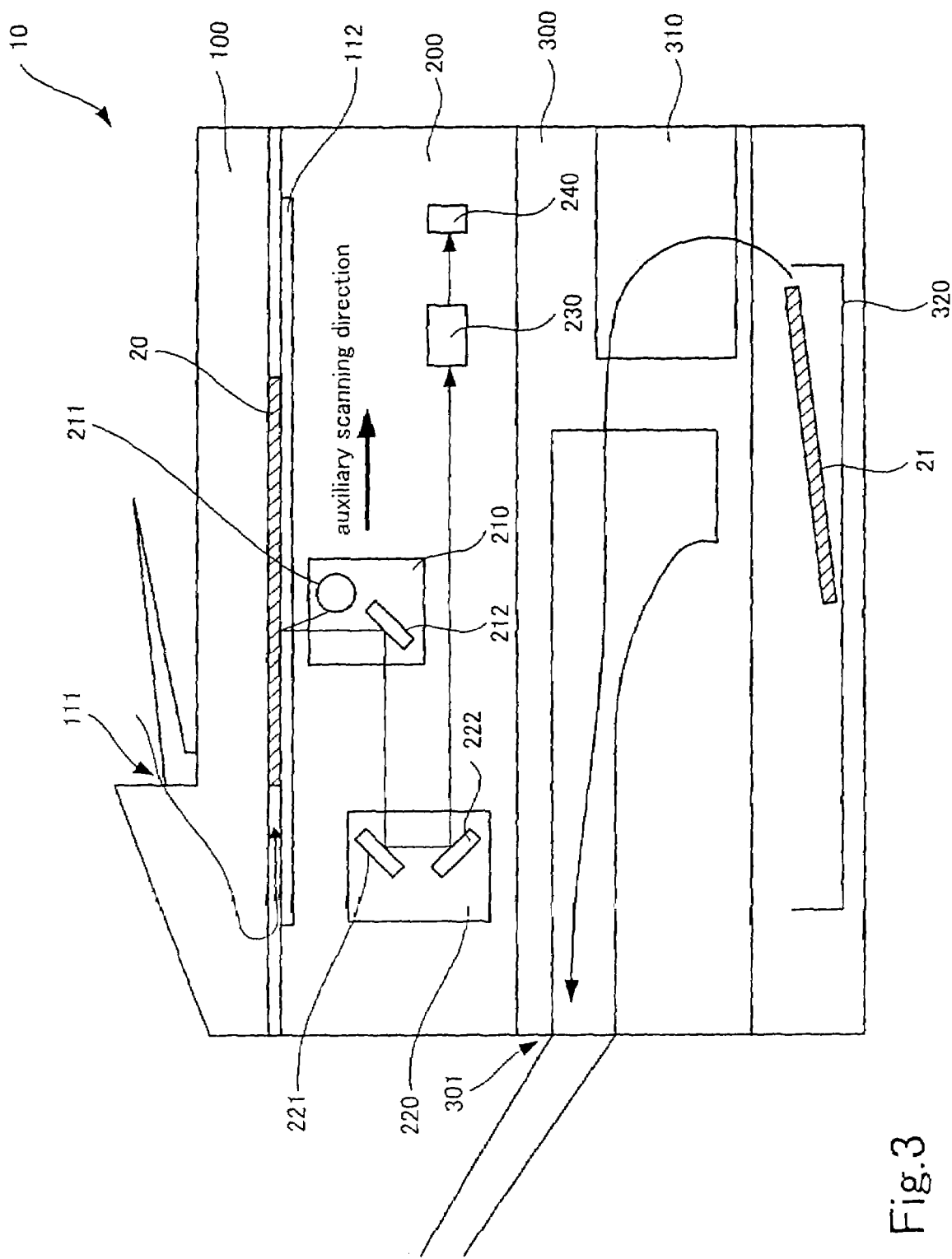
FIG. 3 is a block diagram of a copying machine to which an embodiment of the present invention is applied.

FIG. 3 is a block diagram of a copying machine to which an embodiment of the present invention is applied. Reference numeral 10 denotes a line scanning type copying machine which scans an image on an original document by each line extended in the main scanning direction.

The copying machine 10 has an upper cover 100 on which an original document image 20 is to be set, an image reading section 200 which reads the original document image 20 so as to generate image data and a transfer/fixing device 300 for transferring an image represented by the image data to a paper 21 and fixing it thereon. The copying machine 10 can execute constant velocity transport (CVT) reading in which the original document image 20 set on a paper feeding port 111 of the upper cover 100 by an operator is fed in between the upper cover 100 and an exposure glass 112 by a paper feeding unit (not shown) so as to read the original document image 20 through an image reading section 200 and further, ordinary reading in which the original document image 20 set between the upper cover 100 and the exposure glass 112 by the operator is read by the image reading section 200.

The image reading section 200 includes a first carriage 210 having a lamp 211 and a first mirror 212, a second carriage 220 having a second mirror 221 and a third mirror 222, a lens 230 and an image pickup device 240. The first carriage 210 moves in an auxiliary scanning direction at a predetermined moving velocity while irradiating the original document image with light through a lamp 211. The moving velocity of the first carriage 210 in the auxiliary scanning direction is determined by a reading magnification for the original document image specified by the operator. Reflected light, which is reflected on the original document image 200 after being irradiated from the lamp 211, is incident upon the lens 230 through the second mirror 221 and the third mirror 222 in the second carriage and focused on the image pickup device 240. The image pickup device 240 accumulates electric charges based on received light and converts the accumulated electric charge into an analog signal. According to this embodiment, CCD is used as the image pickup device 240. Outputted analog signal is converted to digital image data and that image data is subjected to various kinds of correction processing and then sent to the transfer/fixing device 300.

If the image data is sent to the transfer/fixing device 300, a paper 21 accommodated in a tray 320 is sent to the transfer/fixing section 310 by a paper feeding unit (not shown) The transfer/fixing section 310 transfers and fixes an image represented by the image data on the paper 21. The paper 21 on which the image is formed is sent to a paper discharge port 301.

Figure 4:
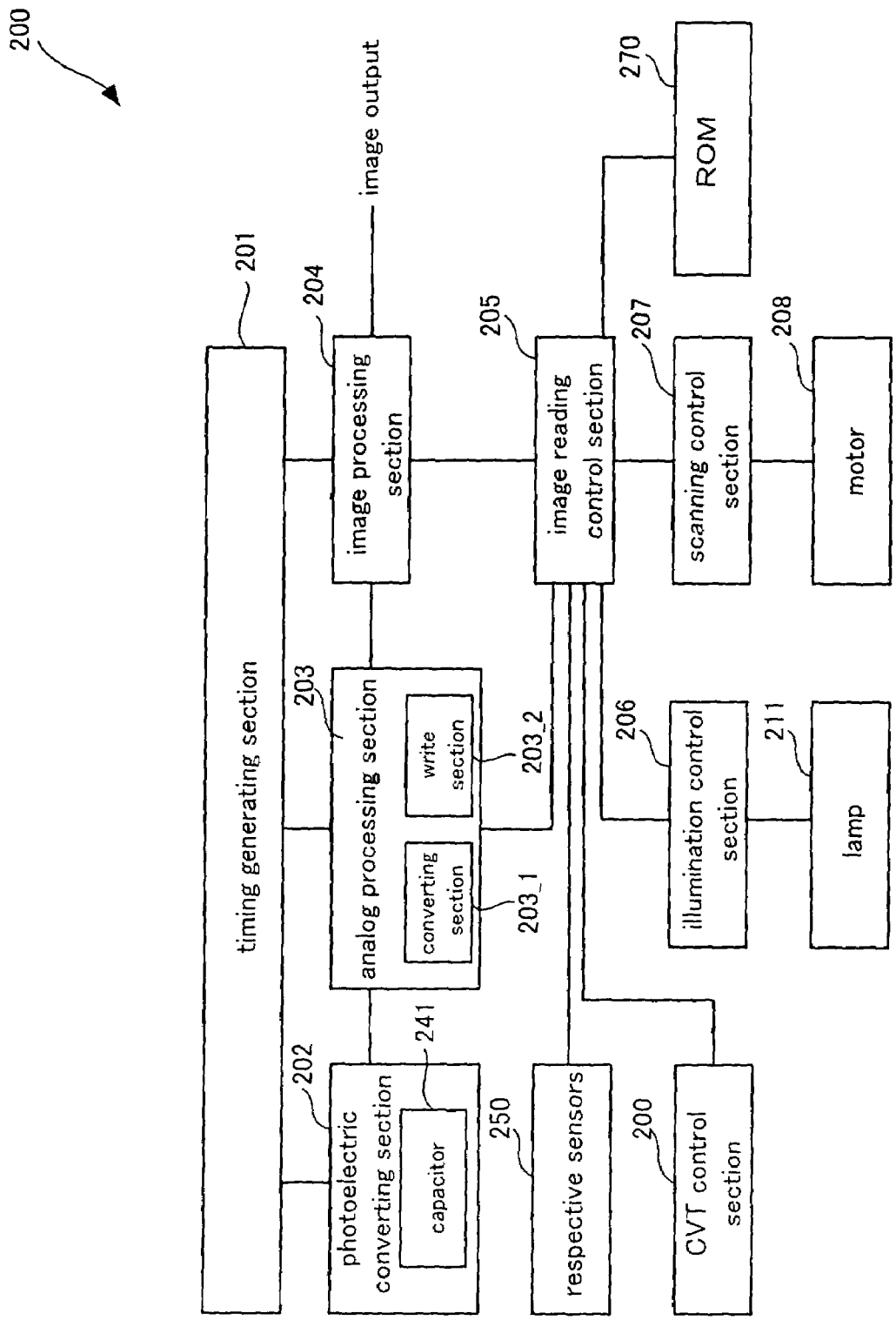
FIG. 4 is a function block diagram of an image reading section shown in FIG. 3.

FIG. 4 is a functional block diagram of the image reading section shown in FIG. 3.

The image reading section 200 includes a timing generating section 201 for generating a timing for various kinds of processing, a photoelectric converting section containing a charge coupled device (CCD) 240, which converts light focused by the lens 230 shown in FIG. 3 to electric charge and generates an analog signal based on the converted electric charge, an analog processing section 203 for converting analog signal to digital image data, an image processing section 204 for executing various kinds of correction processing on the image data, an image reading control section 205 for controlling the various factors shown in FIG. 4, an illumination control section 206 for controlling the light quantity and the like from the lamp 211, a scanning control section 207 for controlling the moving of the first carriage 210 by driving a motor 208 installed on the first carriage 210 shown in FIG. 3, various sensors 250 for detecting the temperature and humidity, a CVT control section 260 for controlling, for example, paper feeding velocity and a ROM 270, which is a memory used in the image reading control section 205.

The lamp 211 shown in FIG. 3 irradiates the scanning object line on the original document image 200 with light and reflected light from plural points arranged on the scanning object line are focused on the image pickup device 240 of the photoelectric converting section 202. The image pickup device 240 is provided with a capacitor 241 for accumulating electric charge and electric charges are fixed by transferring the respective electric charges corresponding to each received reflected light to the capacitor 241 all at sudden. The photoelectric converting section 202 reads out electric charges accumulated in the capacitor 241 one by one and the read out electric charge is converted to an analog signal successively. The photoelectric converting section 202 corresponds to an example of the line scanning section in the image reading apparatus of the present invention.

The analog processing section 203 includes a converting section 203_1 and a write section 203_2. The converting section 203_1 converts an analog signal to digital image data and the converted image data is written into a line buffer, which will be described later, provided on the image processing section 204 by the write section 203_2. This converting section 203_1 corresponds to an example of the data converting section in the image reading apparatus of the present invention and the write section 203_2 corresponds to an example of the image write section in the image reading apparatus of the present invention.

The image processing section 204 reads out image data written in the line buffer at a predetermined timing and executes various kinds of correction processing on that image data.

The features of the copying machine as the image reading apparatus of the present invention exist in the timing generated by the timing generating section 201 and the motion of each factor driven according to that timing. Hereinafter, the timing generating section 201 will be described in detail.

Figure 5:
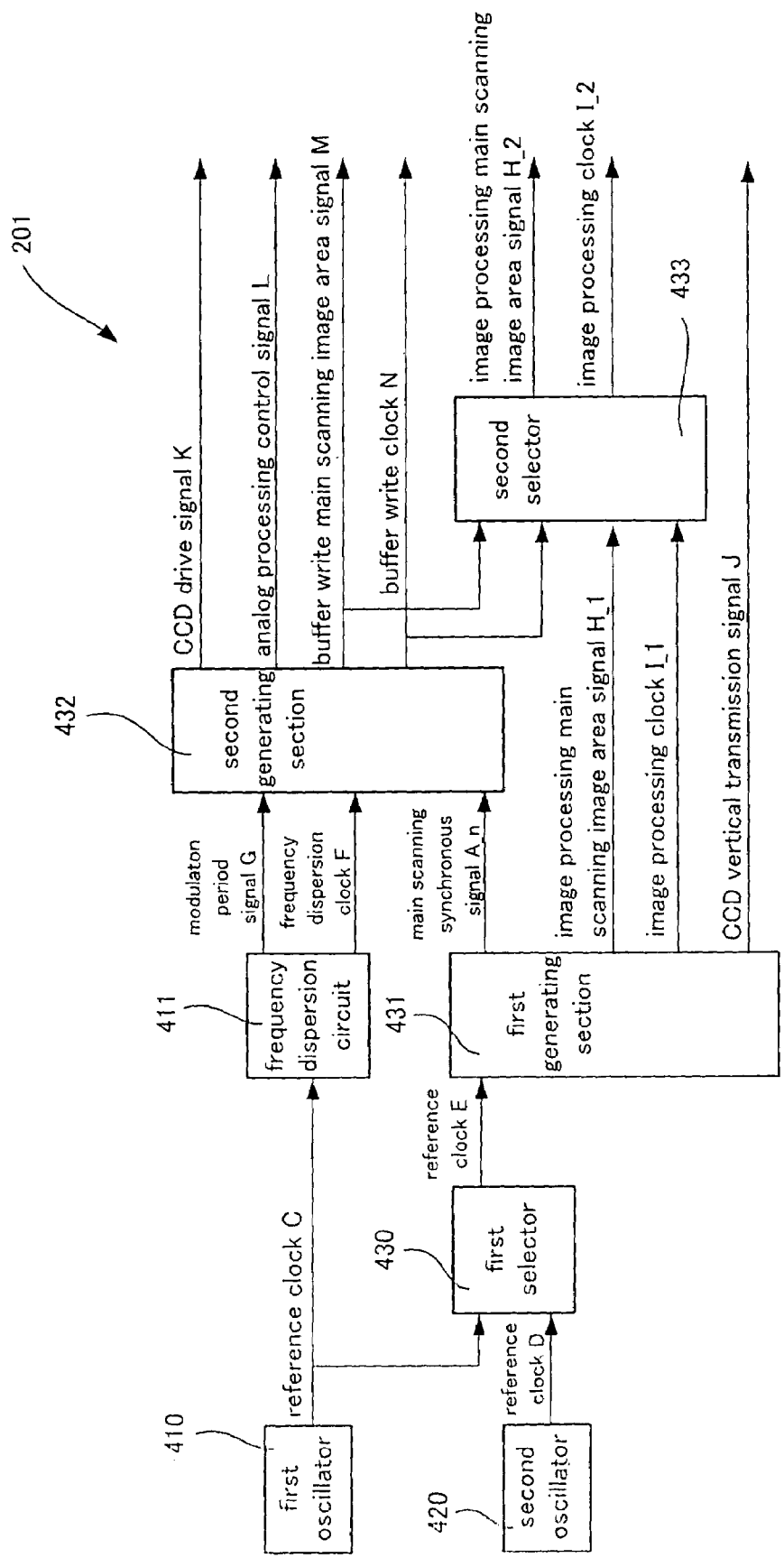
FIG. 5 is a diagram showing a timing generating section.

FIG. 5 is a diagram showing the timing generating section.

The timing generating section 201 includes a first oscillator 410, a frequency dispersion circuit 411, a second oscillator 420, a first selector 430, a first generating section 431, a second generating section 432 and a second selector 433.

A reference clock C having a predetermined oscillation frequency is generated by the first oscillator 410. The reference clock C is transmitted to the first selector 430 and the frequency dispersion circuit 411. This reference clock C corresponds to an example of the reference clock of the present invention.

The second oscillator 420 generates a reference clock D having a smaller oscillation frequency than the oscillation frequency of the first oscillator 410. The reference clock D is transmitted to the first selector 430. This reference clock D corresponds to an example of the second clock of the present invention.

If the reference clock C or the reference clock D is selected as a reference clock E for use in the first generating section 431 by the operator, the first selector 430 transmits the selected reference clock E to the first generating section 431. By providing with such a first selector 430, the reference clock E can be exchanged even after the apparatus is designed. This first selector 430 corresponds to an example of the first selector in the image reading apparatus of the present invention.

The first generating section 431 generates a main scanning synchronous signal A_n which turns into assert state at a predetermined period (hereinafter referred to as main scanning period) with reference to the reference clock E, a signal H_1 for instructing a period in which the image processing section 204 reads the image data from the line buffer, an image processing clock I_1 which is used as the drive clock in the image processing section 204, and a CCD vertical transmission signal J for instructing a timing for transferring the electric charges accumulated by the photoelectric converting section 202 to the capacitor 241.

According to this embodiment, the main scanning period is determined depending on the reading magnification for the original document image and synchronous with the moving velocity of the first carriage 210 in the auxiliary scanning direction. If the main scanning period when the original document image is read at 100% (equal magnification) in this embodiment is assumed to be T_100, the main scanning period T n when reading at n % magnification is calculated according to T_n=T_100×(n/100). This main scanning synchronous signal A_n corresponds to an example of the first signal and the first generating section 431 corresponds to an example of the first signal generating section in the image reading apparatus of the present invention. The main scanning synchronous signal A_n is transmitted to the second generating section 432 and the area signal H_1 and the image processing clock I_1 are transmitted to the second selector 433. The CCD vertical transmission signal J is transmitted to the photoelectric converting section 202 shown in FIG. 4.

The frequency dispersion circuit 411 converts the reference clock C to a frequency dispersion clock F which deflects the reference clock C cyclically at the modulation period T. Further, a modulation period signal G which turns into assert state at a timing synchronous with the modulation period T_F of the frequency dispersion clock F is generated. This modulation period T_F corresponds to an example of the modulation period of the present invention, the modulation period signal G corresponds to an example of the second signal of the present invention and the frequency dispersion circuit 411 corresponds to an example of the second signal generating section in the image reading apparatus of the present invention. The frequency dispersion clock F and the modulation period signal G are transmitted to the second generating section 432.

The second generating section 432 generates a CCD drive signal K for instructing a timing for reading electric charges from the capacitor 241 by means of the photoelectric converting section 202 shown in FIG. 4, an analog processing control signal L for instructing a timing for converting an analog signal to digital image data by means of the converting section 203_1 of the analog processing section 203, and an area signal M for instructing a period in which image data is written into the line buffer of the image processing section 204 by the write section 203_2 based on the frequency dispersion clock F, modulation period signal G and the main scanning synchronous signal A_n. The second generating section 432 generates a buffer write clock N which is a drive clock used in the write section 203_2 based on the frequency dispersion clock F. The CCD drive signal K is transmitted to the photoelectric converting section 202 and the analog processing control signal L is transmitted to the converting section 203_1 of the analog processing section 203. The area signal M and buffer write clock N are transmitted to the write section 203_2 and the second selector 433.

If a clock (image processing clock I_1) generated by the first generating section 431 or a clock (buffer write clock N) generated by the second generating section 432 is selected as the image processing clock I_2 by an operator, the second selector 433 transmits the selected image processing clock I_2 to the image processing section 204 shown in FIG. 4 with the area signal H_2. By providing with such second selector 433, the image processing clock I_2 can be changed over even after the apparatus is designed. This second selector 433 corresponds to an example of the second selector in the image reading apparatus of the present invention.

Basically, the timing generating section 201 has the following structure.

Figure 6:
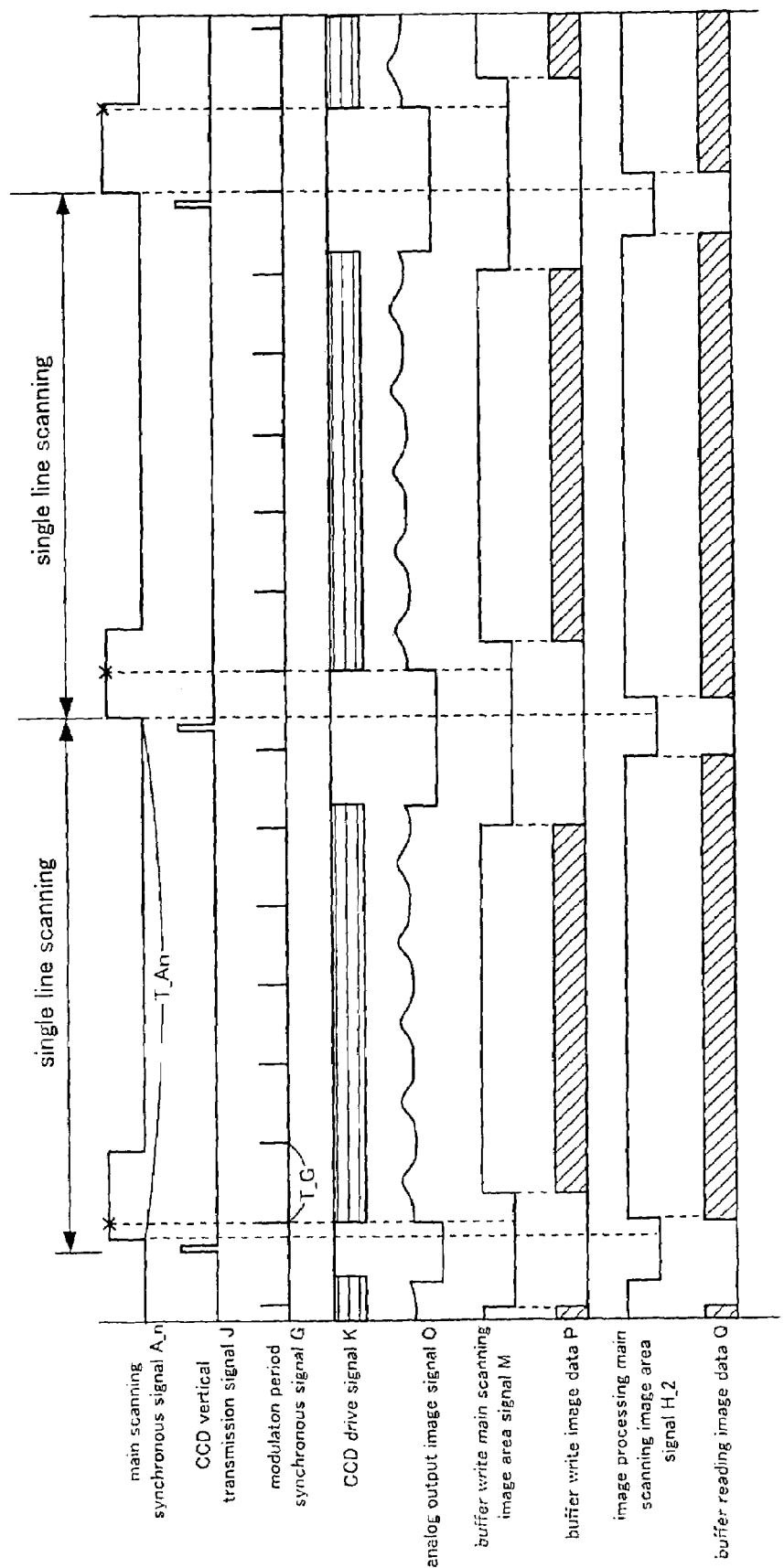
FIG. 6 is a timing chart of various kinds of signals generated by a timing generating section.

FIG. 6 is a timing chart of various kinds of signals generated by the timing generating section. In a following description, a single operation unit from start of scanning a scanning object line in the main scanning direction to start of scanning a next scanning object line in the main scanning direction is called single line scanning.

The main scanning synchronous signal A_n is in assert state at the main scanning period T_An and the modulation period signal G is in assert state at a period T_G synchronous with the modulation period T_F of the frequency dispersion clock F.

The CCD vertical transmission signal J is in assert state at a predetermined phase timing together with the main scanning synchronous signal A_n, and the CCD drive signal K and analog output image signal O start output synchronously with a timing when the main scanning synchronous signal A_n and modulation period signal G turn into assert state.

The analog output image signal O contains various kinds of information at its head and tail sections. The area signal M is not used by factors subsequent to the line buffer of these various kinds of information. In order not to contain a waste portion, area excluding the head section and tail section is in assert state. If a timing for converting analog image signal to digital image data is transmitted by the analog processing control signal L, the converting section 203_1 shown in FIG. 4 converts the analog output image signal O to digital image data P. While the area signal M is in assert state, the image data P is written into the line buffer synchronously with the write clock N in the write section 203_2. According to this embodiment, two line buffers are prepared and image data is written into these lien buffers alternately.

The area signal H_2 and image data Q, which are read out from the line buffer by the image processing section 204 in FIG. 4 synchronously with the image processing clock I_2 in FIG. 5, are outputted synchronously with a timing when the main scanning synchronous signal A_n turns to assert state. When the area signal H_2, which is outputted synchronously with a timing when the main scanning synchronous signal A_n turns to assert state, is in assert state, the image data Q is read out from the line buffer by the image processing section 204 shown in FIG. 4 synchronously with the image processing clock I_2 shown in FIG. 5. According to this embodiment, the image data P written into the line buffer of the two buffers before scanning a single line is read out as the image data Q.

Figure 7:
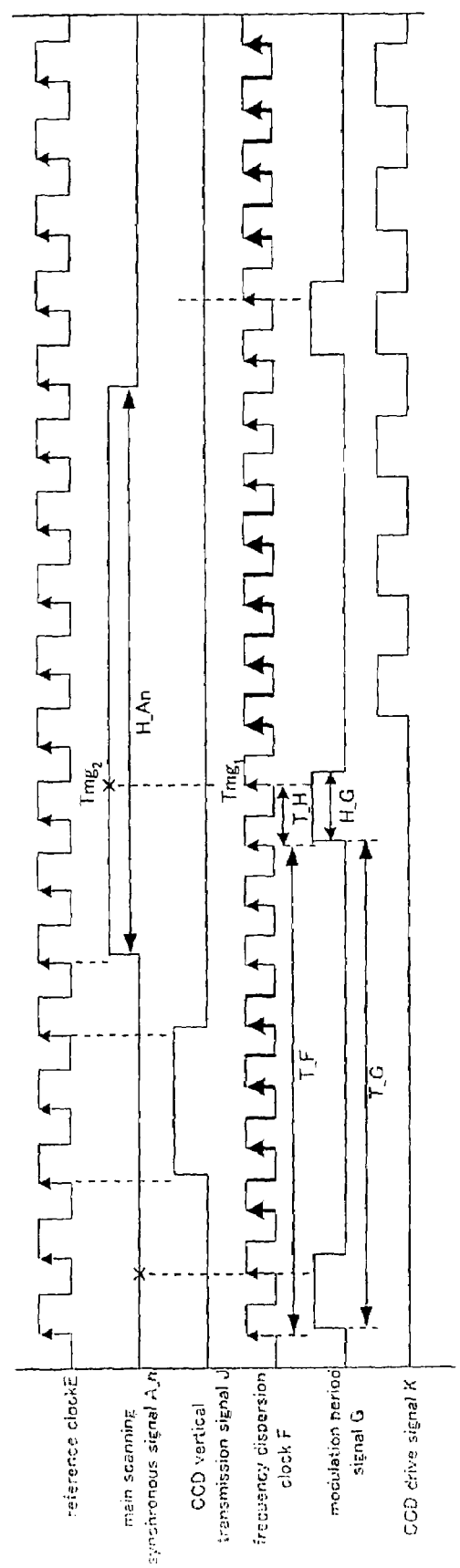
FIG. 7 is a diagram showing part of the timing chart in FIG. 6 in enlargement.

FIG. 7 is a diagram showing part of the timing chart shown in FIG. 6 in enlargement.

As shown in FIG. 7, the modulation period signal G is in assert state synchronous with the modulation period T_F of the frequency dispersion clock F and its assert period H_G is longer than a single period T_F of the frequency dispersion clock F. Therefore, the assert section H_G of the modulation period signal G always contains a timing Tmg1 in which the frequency dispersion clock F rises up. If the rise-up timing of the frequency dispersion clock F is contained plural times in the assert section H_G of the modulation synchronous signal G, its most preceding timing is selected as a timing Tmg1 and a specific timing in the modulation period T-F is always extracted. The assert section H_An of the main scanning synchronous signal A_n is longer than a single period T_G of the modulation period signal G. Therefore, the assert section H_An of the main scanning synchronous signal A_n always contains a timing when the modulation period signal G turns to assert state. Thus, the main scanning synchronous signal A_n and modulation period signal G turn to assert state at the same time and a timing Tmg2 in which the frequency dispersion clock F rises up is always generated.

Here, if the assert section H_An of the main scanning synchronous signal A contains the timing when the modulation period signal G turns to assert state plural times, its most preceding timing is selected as a timing Tmg2 and thus, a specific timing in the main scanning synchronous signal A_n is always extracted.

The CCD vertical transmission signal J is in assert state at a predetermined phase timing to the main scanning synchronous signal A_n. When the CCD vertical transmission signal J shown in FIG. 6 is in negate condition, light is received by the photoelectric converting section 202 shown in FIG. 4 and electric charges are accumulated. Then, the accumulated electric charges are moved to the capacitor 241 all at once at a timing when the CCD vertical transmission signal J turns to assert state.

Figure 8:
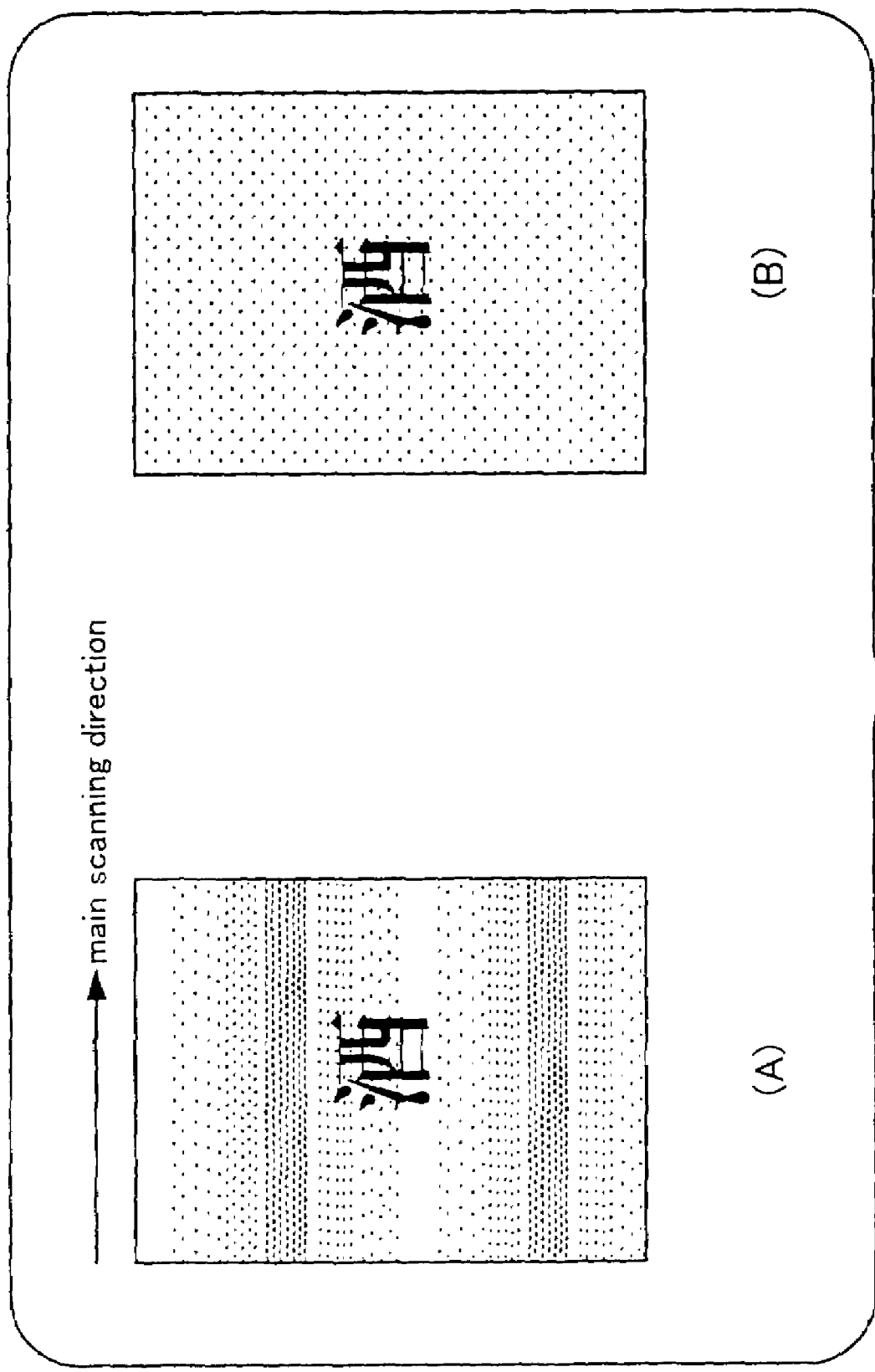
FIG. 8 is a diagram showing a difference in image formed on a paper when electric charges accumulated on a capacitor are different between each other.

FIG. 8 is a diagram showing a difference in image formed on paper when the period of the vertical transmission signal differs depending on each line.

Part (A) of FIG. 8 shows an image formed when the timing when the CCD vertical transmission signal J turns to assert state is matched with the timing Tmg2 in FIG. 7. If the timing when the CCD vertical transmission signal J turns to assert state is matched with the timing Tmg2, time in which electric charges are accumulated by the photoelectric converting section 202 differs depending on each line scanning, because the position of the timing Tmg2 is changed by each line deviation. Consequently the quantity of electric charges accumulated in the photoelectric converting section 202 is changed. The change in the quantity of the electric charges appears in the form of a change in image density as shown in part (A), thereby the quality of an image being reduced. Thus, according to this embodiment, as shown in FIG. 7, the timing when the CCD vertical transmission signal J turns to assert state is matched with not the timing Tmg2 but a timing when the main scanning synchronous signal A_n turns to assert state. Consequently, the accumulation time of the photoelectric converting section 202 becomes constant, so that as shown in part (B) of FIG. 8, an image having a uniform density can be formed.

The CCD drive signal K shown in FIG. 7 is started to be oscillated at a timing synchronous with the timing Tmg2 and oscillated synchronously with the frequency dispersion clock F. Electric charges accumulated in plural intermediate capacitors in the capacitor 241 are read out one by one synchronously with the CCD drive signal K by the photoelectric converting section 202 and an analog signal shown in analog output image signal O in FIG. 6 is outputted based on the read out electric charge. The timing Tmg2 is always a timing at the same position of the frequency dispersion clock F and the same influence of the frequency dispersion clock F is received at each line scanning by reading electric charges or outputting an analog signal corresponding to this timing Tmg2.

Figure 9:
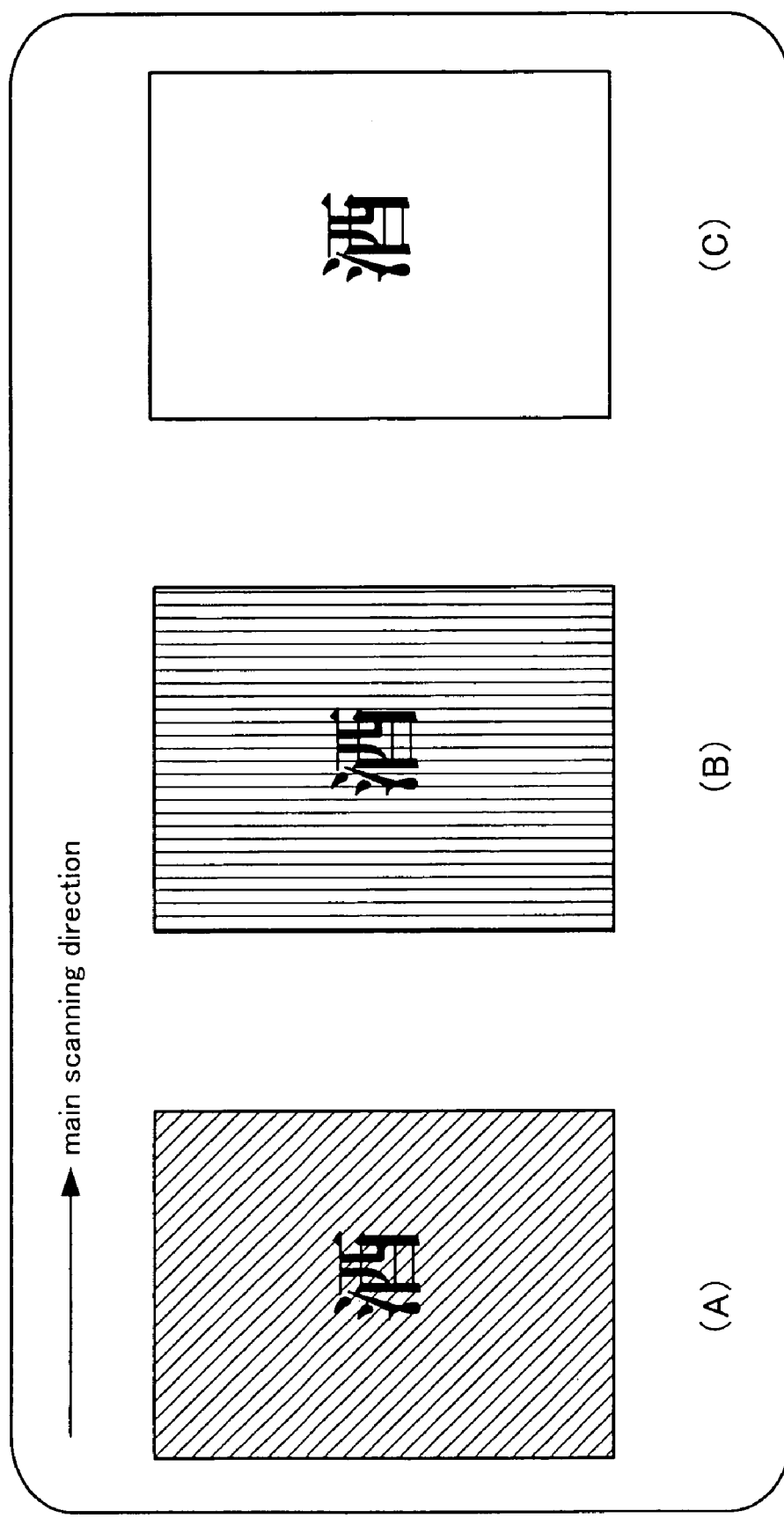
FIG. 9 is a diagram showing a difference in image formed on a paper when processing timing in an photoelectric converting section differs.

FIG. 9 is a diagram showing a difference in image formed on paper when the processing timing in the photoelectric converting section differs.

Part (A) of FIG. 9 shows an image formed when the timing of reading electric charges or outputting an analog signal is matched with not the timing Tmg2 but a timing when the main scanning synchronous signal A_n turns to assert state. In this case, the frequency dispersion clock F at that timing is changed at each line scanning so that beat noise turns to oblique stripes, which is difficult to correct. Thus according to this embodiment, the timing of reading electric charges or outputting an analog signal is matched with the timing Tmg2. Consequently, the same influence of the frequency dispersion clock F is received at each line scanning and as a result, the beat noise is corrected to vertical stripes perpendicular to the main scanning direction as shown in part (B) of FIG. 9. Such vertical beat noise can be corrected easily by the shading correction which has been executed conventionally. This correction processing will be described later.

A following description will be made with reference to FIG. 6.

Because the main scanning synchronous signal A_n is a signal oscillated synchronously with the main scanning period T_An determined by an image reading magnification specified by an operator, if 50% magnification is specified, the image is read at a velocity twice as many as when equal magnification (100%) is specified and then, the main scanning synchronous signal A_n is oscillated synchronously with the main scanning period, one-half the time when the equal magnification is selected.

In this case, there always exists a timing Tmg2 when the main scanning synchronous signal A_n, the modulation period synchronous signal G and the frequency dispersion clock F turn to assert state and reading of electric charges and output of an analog signal are carried out at a timing synchronous with that timing Tmg2. Therefore, beat noise can be always corrected to vertical stripes regardless of the magnification.

The area signal turns into assert state with a predetermined difference in phase from the timing Tmg2. The buffer write image data P is written into the line buffer when the area signal M is in assert state. On the other hand, the timing for reading image data written into the line buffer (timing when the area signal H_2 is oscillated) does not need to be synchronous with the timing Tmg2 and if plural line buffers are provided, the buffer write image data P may be stored therein and read out all at once after that. Further, as the image processing clock I_1 shown in FIG. 5 which is a drive clock for the image processing section 204, it is preferable to adopt a reference CLKB having a low frequency. The apparatus can be operated at a lower frequency by an extent that there exists no waste area as compared to the analog processing section 203, because only effective area portion in the image data is read out from the line buffer. Therefore, radiated noise can be reduced by adopting a low frequency clock which does not need to be subjected to the frequency dispersion processing, as the drive clock of the image processing section 204.

Subsequently, the shading correction will be described.

Figure 10:
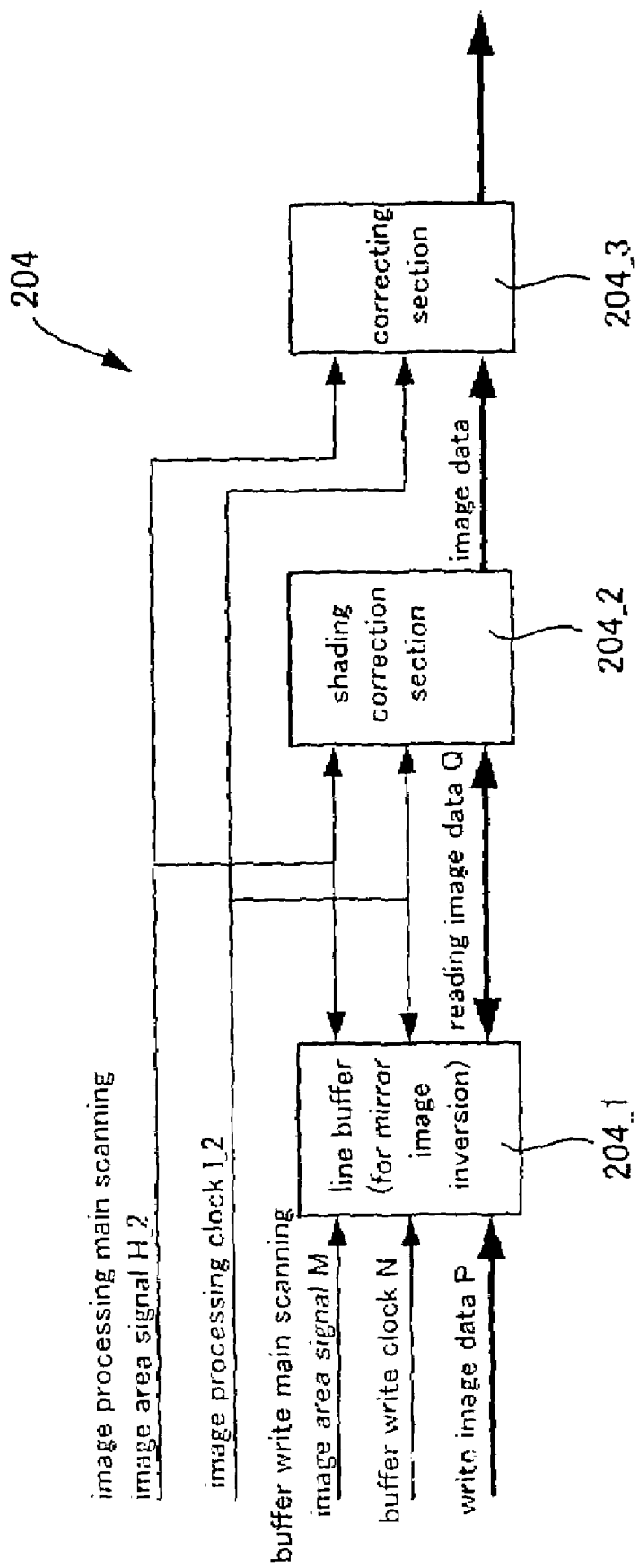
FIG. 10 is a structure diagram of an image processing section shown in FIG. 4.

FIG. 10 is a structure diagram of the image processing section shown in FIG. 4.

The image processing section 204 includes a line buffer 204_1, a shading correction section 204_2 and a correcting section 204_3.

Because in the above-described reading, the original document image 20 set on the paper feeding port 111 shown in FIG. 3 is scanned while fed on the exposure glass 112, the read image turns into a relation of mirror image with an image picked up by the reading action. The line buffer 204_1 has a role as a mirror image buffer for inverting the mirror image. Of the write image data P, image data of a portion indicated by the area signal M is written into the line buffer 204_1 synchronously with buffer write clock N. This line buffer 204_1 corresponds to an example of the line buffer in the image reading apparatus of the present invention and also to an example of the mirror image buffer in the image reading apparatus of the present invention.

When the area signal H_2 is in assert state, the shading correction section 204_2 reads out image data from the line buffer 204_1, and applies the shading correction which has been widely carried out in the image reading apparatus conventionally on that image data, and corrects beat noise of the vertical stripes shown in part (B) of FIG. 9 so as to generate an image shown in part (c) of FIG. 9. The shading correction section 204_2 corresponds to an example of the image correcting section in the image reading apparatus of the present invention. The shading correction section 204_2 will be described in detail later.

The correcting section 204_3 acquires image data whose beat noise is corrected by the shading correction section 204_2 and applies various kinds of correction processing upon that image data synchronously with the image processing clock I_1. The various kinds of the correction processing have been executed conventionally and therefore, description thereof is omitted.

Figure 11:
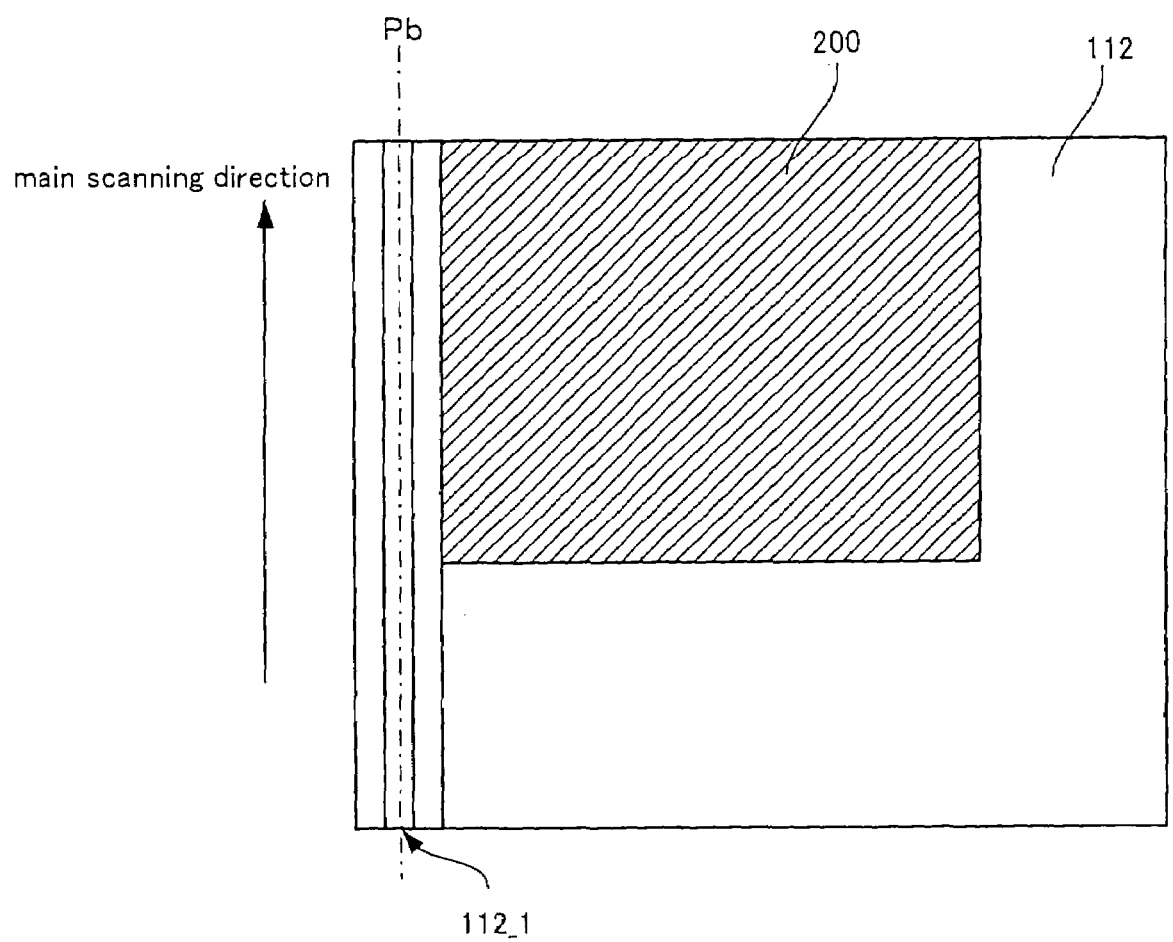
FIG. 11 is a diagram showing an exposure glass on which original document image is set.

FIG. 11 is a diagram showing an exposure glass on which an original document image is set.

The shading correction is a processing of smoothing unevenness in reading sensitivity in the main scanning direction and distribution of light quantity in the copying machine 10. Upon the shading correction, a predetermined position Pb on a white reference plate 112_1 provided on the exposure glass shown in FIG. 11 is read out in the main scanning direction.

Figure 12:
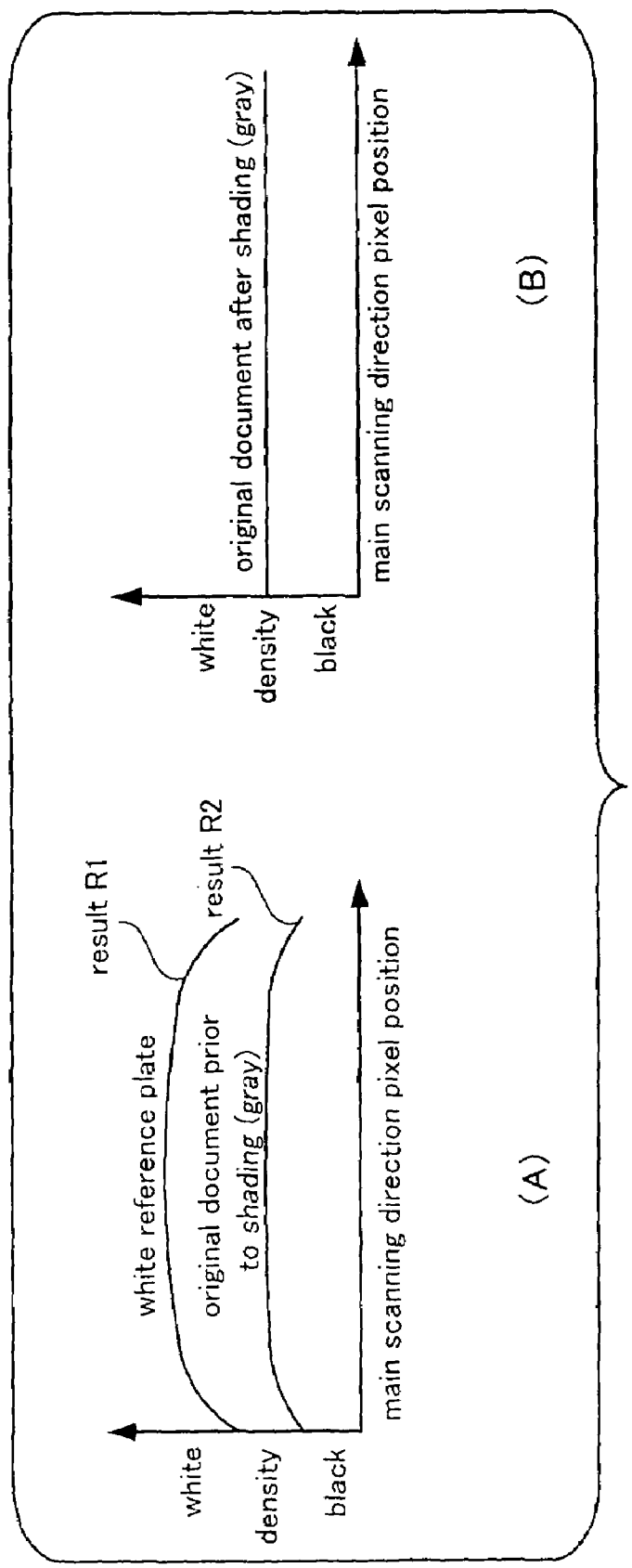
FIG. 12 is a diagram for explaining ordinary shading correction.

FIG. 12 is a diagram for explaining ordinary shading correction.

A result R1 in part (A) of FIG. 12 indicates the relation between a position in the main scanning direction on the white reference plate 112_1 shown in FIG. 11 and the density when that postion is read out. Although a result R1 must turn to parallel lines because the white reference plate 112_1 is a uniform white plate. But actually its both ends turn black because of unevenness in the reading sensitivity of the copying machine 10. A result R2 indicates the relation between a position in the main scanning direction on the original document image having uniform gray and the density when that position is read out. The same influence of the unevenness in reading sensitivity as the result R1 when the white reference plate 112_1 is read out is generated in the result R2 generated by reading the original document image 200. The shading correction section 204_2 shown in FIG. 10 carries out a processing of raising the reading sensitivity for the both ends in the main scanning direction.

Part (B) of FIG. 12 shows the relation between a position in the main scanning direction on the original document image after the shading correction and the density when that image is read. The shading correction smoothes the unevenness in reading sensitivity of the copying machine 10 and when an original document image 20 having a uniform density is read, a uniform density is represented.

Figure 13:
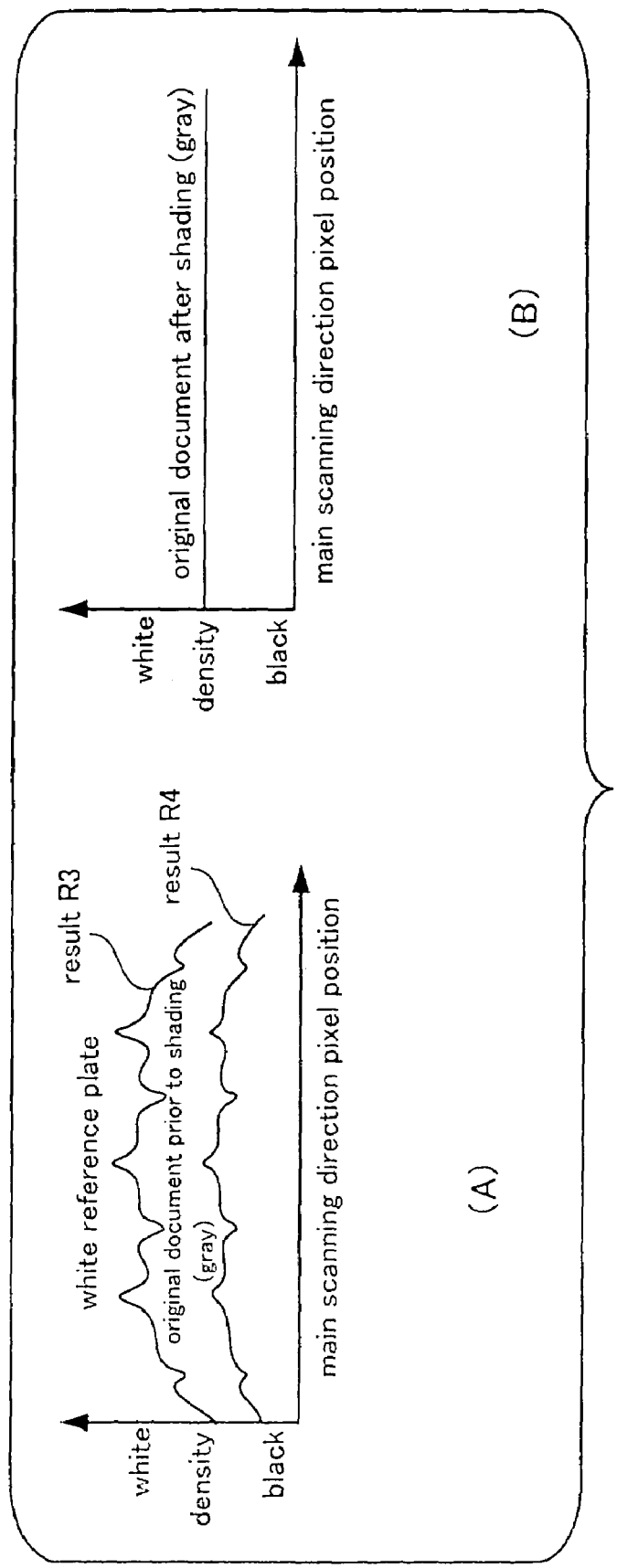
FIG. 13 is a diagram for explaining a processing for correcting a beat noise.

FIG. 13 is a diagram for explaining a processing for correcting beat noise.

If the influence of the frequency dispersion clock is not received, the relation between the position in the main scanning direction and the density when that position is read out turns to a curve as shown in part (A) of FIG. 12. If an image is scanned according to the frequency dispersion clock by the copying machine 10 of this embodiment, the vertical beat noise is generated in the read image as shown in part (B) of FIG. 9. Therefore the relation between the position in the main scanning direction on the white reference plate 112_1 shown in FIG. 11 and the density when that position is read out is indicated by the result R3 of FIG. 13, which includes noise in the result R1 of FIG. 12. The relation between the position in the main scanning direction on the original document image 200 and the density when that position is read out is indicated by the result R4, which includes same noise as in R3 added this time to the result R2 of FIG. 12. Noises generated in the result R3 and result R4 are handled as unevenness in reading sensitivity by the copying machine 10 and by adjusting the reading sensitivity of the copying machine 10 by the above-described shading correction, a result that the noises are removed as shown in FIG. 13B can be obtained.

As described above, the copying machine of this embodiment always corrects the beat noise to vertical stripes regardless of the velocity of reading an image. Therefore, by removing that beat noise by the shading correction which has been carried out conventionally, a beautiful image in which the beat noise is corrected can be generated.

What is claimed:

1. An image reading apparatus that reads out an original document image synchronously with a frequency dispersion clock gained by a modulation which makes the frequency of a reference clock change cyclically at a predetermined modulation period, comprising:
   a first signal generating section that generates a first signal which turns into assert state at a predetermined period;
   a second signal generating section that generates a second signal which turns into assert state at a period synchronous with the modulation period of the frequency dispersion clock; and
   a line scanning section that moves a scanning position on the original document image in an auxiliary scanning direction and scans the original document image in a main scanning direction perpendicular to the auxiliary scanning direction each time when both the first signal and the second signal turn to assert state and thereby reads the original document image and outputs an analog image signal.

2. The image reading apparatus according to claim 1 wherein the second signal generating section generates the second signal which remains in assert state for more than one period of the frequency dispersion clock.

3. The image reading apparatus according to claim 1 wherein the first signal generating section generates the first signal which remains in assert state for more than one period of the second signal.

4. The image reading apparatus according to claim 1 wherein the first signal generating section generates the first signal which turns into assert state at a period synchronous with the period of a predetermined clock,
   the image reading apparatus further comprising a first selector which selects a predetermined clock used in the first signal generating section between any one of the reference clock and the second clock having a different frequency from the reference clock.

5. The image reading apparatus according to claim 4 wherein the second clock has a smaller frequency than the frequency of the reference clock.

6. The image reading apparatus according to claim 1 further comprising an image correcting section which corrects an image noise generated in an image represented by image data generated by reading the original document image and caused by the modulation of the frequency of a reference clock to gain the frequency dispersion clock.

7. The image reading apparatus according to claim 6 wherein the image correcting section corrects the image noise using shading correction of smoothing unevenness in reading sensitivity in the main scanning direction of the line scanning section.

8. The image reading apparatus according to claim 1 further comprising:
a data converting section that converts an analog image signal outputted from the line scanning section to digital image data synchronously with the frequency dispersion clock;
a line buffer that stores the image data;
an image write section that writes image data converted by the data converting section into the line buffer synchronously with a timing when the first signal and the second signal turn into assert state; and
an image reading section that reads out image data written into the line buffer by the image write section at a timing synchronous with a predetermined basic timing.

9. The image reading apparatus according to claim 8 further comprising a second selector which selects the basic timing used in the image reading section between any one of a timing when the first signal turns to assert state and a timing when both the first signal and the second signal turn to assert state.

10. The image reading apparatus according to claim 8 wherein an image correcting section, which corrects an image noise generated in an image represented by image data generated by reading the original document image and caused by the modulation of the frequency of the reference clock to gain the frequency dispersion clock, is provided at a stage subsequent to the line buffer.

11. The image reading apparatus according to claim 8 wherein the line buffer also serves as a mirror image buffer which outputs mirror image data representing a mirror image obtained by inverting an image represented by image data generated by reading the original document image.

12. The image reading apparatus according to claim 1 wherein the line scanning section receives light emitted from each of plural points arranged in the main scanning direction on the original document image, accumulates respective electric charges corresponding to the light quantity, fixes the respective electric charges all at once synchronously with a timing when the first signal turns into assert state and converts successively the fixed respective electric charges to analog image signal synchronously with the frequency dispersion clock each time when the first signal and second signal turn into assert state.

13. An image forming apparatus that reads out an original document image synchronously with a frequency dispersion clock gained by a modulation which makes the frequency of a reference clock change cyclically at a predetermined modulation period and that forms plural images of the original document image, comprising:
a first signal generating section that generates a first signal which turns into assert state at a predetermined period;
a second signal generating section that generates a second signal which turns into assert state at a period synchronous with the modulation period of the frequency dispersion clock; and
a line scanning section that moves a scanning position on the original document image in an auxiliary scanning direction, scans the original document image in a main scanning direction perpendicular to the auxiliary scanning direction each time when both the first signal and the second signal turn to assert state and thereby reads the original document image and outputs an analog image signal.

14. The image forming apparatus according to claim 13 wherein the second signal generating section generates the second signal which remains in assert state for more than one period of the frequency dispersion clock.

15. The image forming apparatus according to claim 13 wherein the first signal generating section generates the first signal which remains in assert state for more than one period of the second signal.

16. The image forming apparatus according to claim 13 wherein the first signal generating section generates the first signal which turns into assert state at a period synchronous with the period of a predetermined clock, the image forming apparatus further comprising a first selector which selects a predetermined clock used in the first signal generating section between any one of the reference clock and the second clock having a different frequency from the reference clock.

17. The image forming apparatus according to claim 16 wherein the second clock has a smaller frequency than the frequency of the reference clock.

18. The image forming apparatus according to claim 13 further comprising an image correcting section which corrects an image noise generated in an image represented by image data generated by reading the original document image and caused by the modulation of the frequency of a reference clock to gain the frequency dispersion clock.

19. The image forming apparatus according to claim 13 wherein the image correcting section corrects the image noise using shading correction of smoothing unevenness in reading sensitivity in the main scanning direction of the line scanning section.

20. The image forming apparatus according to claim 13 further comprising:
a data converting section that converts analog image signal outputted from the line scanning section to digital image data synchronously with the frequency dispersion clock;
a line buffer that stores the image data;
an image write section that writes image data converted by the data converting section into the line buffer synchronously with a timing when the first signal and the second signal turn into assert state; and
an image reading section that reads out image data written into the line buffer by the image write section at a timing synchronous with a predetermined basic timing.

21. The image forming apparatus according to claim 20 further comprising a second selector which selects the basic timing used in the image reading section between any one of a timing when the first signal turns to assert state and a timing when both the first signal and the second signal turn to assert state.

22. The image forming apparatus according to claim 20 wherein an image correcting section, which corrects an image noise generated in an image represented by image data generated by reading the original document image and caused by the modulation of the frequency of a reference clock to gain the frequency dispersion clock, is provided at a stage subsequent to the line buffer.

23. The image forming apparatus according to claim 20 wherein the line buffer also serves as a mirror image buffer which outputs mirror image data representing a mirror image obtained by inverting an image represented by image data generated by reading the original document image.

24. The image forming apparatus according to claim 13 wherein the line scanning section receives light emitted from each of plural points arranged in the main scanning direction on the original document image and accumulates respective electric charges corresponding to the light quantity, fixes the respective electric charges all at once synchronously with a timing when the first signal turns into assert state and converts successively the fixed respective electric charges to analog image data synchronously with the frequency dispersion clock each time when the first signal and second signal turn into assert state.

25. An image reading method that reads out an original document image synchronously with a frequency dispersion clock gained by a modulation which makes the frequency of a reference clock change cyclically at a predetermined modulation period, comprising the steps of:
  generating a first condition in which assert state at a predetermined period is generated;
  generating a second condition in which assert state is generated at a period synchronous with the modulation period of the frequency dispersion clock; and
  conducting line scanning in which a scanning position on the original document image is moved in an auxiliary scanning direction, and the original document image is scanned in a main scanning direction perpendicular to the auxiliary scanning direction synchronously with the modulation period of the frequency dispersion clock each time when the assert state is generated in the step of generating the first condition and the step of generating the second condition, and thereby allowing reading of the document image.

26. The image reading method according to claim 25 wherein the step of generating the second condition generates assert state continuously for more than one period of the frequency dispersion clock.

27. The image reading method according to claim 25 wherein the step of generating the first condition generates assert state continuously for more than one period of the second condition.

28. The image reading method according to claim 25 wherein the step of generating the first condition which generates assert state at a period synchronous with the period of a predetermined clock, the image reading method further comprising a first selection step which selects the predetermined clock used in the step of generating the first condition between any one of the reference clock and the second clock having a different frequency from the reference clock.

29. The image reading method according to claim 28 wherein the second clock has a smaller frequency than the frequency of the reference clock.

30. The image reading method according to claim 25 further comprising a step of correcting an image in which correction is made to an image noise generated in an image represented by image data generated by reading the original document image and caused by the modulation of the frequency of a reference clock to gain the frequency dispersion clock.

31. The image reading method according to claim 30 wherein the step of correcting an image corrects the image noise using shading correction of smoothing unevenness in reading sensitivity in the main scanning direction in the step of conducting line scanning.

32. The image reading method according to claim 25 further comprising the steps of:
  converting data in which an image read in the line scanning is converted to digital image data synchronously with the frequency dispersion clock;
  writing image in which image data converted by the data conversion is written into the line buffer synchronously with a timing when the assert state is generated in the step of generating the first condition and the step of generating the second condition; and
  reading image in which image data written into the line buffer by the step of writing image is read at a timing synchronous with a predetermined basic timing.

33. The image reading method according to claim 32 further comprising a second selection step which selects the basic timing used in the step of reading image between any one of a timing when the assert state is generated in the step of generating the first condition and a timing when the assert state is generated in the step of generating the first condition and the step of generating the second condition.

34. The image reading method according to claim 32 wherein a step of correcting an image, in which correction is made to an image noise generated in an image represented by image data generated by reading the original document image and caused by the modulation of the frequency of a reference clock to gain the frequency dispersion clock, is provided subsequent to the image reading step.

35. The image reading method according to claim 32 wherein the line buffer also serves as a mirror image buffer which outputs mirror image data representing a mirror image obtained by inverting an image represented by image data generated by reading the original document image.

36. The image reading method according to claim 25 wherein the step of conducting the line scanning receives light emitted from each of plural points arranged in the main scanning direction on the original document image, accumulates respective electric charges corresponding to the light quantity, fixes the respective electric charges all at once synchronously with a timing when the assert state is generated in the step of generating the first condition, and converts successively the fixed respective electric charges to analog image signal synchronously with the frequency dispersion clock each time when the assert state is generated in the step of generating the first condition and the step of generating the second condition.

* * * * *